US012362906B2

(12) United States Patent
Lee et al.

(10) Patent No.: US 12,362,906 B2
(45) Date of Patent: Jul. 15, 2025

(54) APPARATUS FOR PRIVACY PRESERVING TEXT SEARCH USING HOMOMORPHIC ENCRYPTION AND METHOD THEREOF

(71) Applicant: CRYPTO LAB INC., Seoul (KR)

(72) Inventors: Garam Lee, Seoul (KR); Junbum Shin, Suwon-si (KR)

(73) Assignee: CRYPTO LAB INC., Seoul (KR)

( * ) Notice: Subject to any disclaimer, the term of this patent is extended or adjusted under 35 U.S.C. 154(b) by 166 days.

(21) Appl. No.: 18/463,556

(22) Filed: Sep. 8, 2023

(65) Prior Publication Data

US 2024/0097878 A1    Mar. 21, 2024

(30) Foreign Application Priority Data

Sep. 8, 2022    (KR) ......................... 10-2022-0114120
Jun. 29, 2023    (KR) ......................... 10-2023-0084386

(51) Int. Cl.
| | |
|---|---|
| H04L 9/00 | (2022.01) |
| G10L 15/26 | (2006.01) |
| H04L 9/08 | (2006.01) |
| H04L 9/40 | (2022.01) |

(52) U.S. Cl.
CPC .............. H04L 9/008 (2013.01); G10L 15/26 (2013.01); H04L 9/0825 (2013.01); H04L 63/0442 (2013.01)

(58) Field of Classification Search
CPC ... H04L 9/008; H04L 9/0825; H04L 63/0442; G10L 15/26
See application file for complete search history.

(56) References Cited

U.S. PATENT DOCUMENTS

| | | | | |
|---|---|---|---|---|
| 9,473,302 | B2* | 10/2016 | Yasuda | H04L 9/14 |
| 10,693,626 | B2* | 6/2020 | Ren | H04L 9/008 |
| 10,778,409 | B2* | 9/2020 | Cheon | H04L 9/3093 |
| 11,461,551 | B1* | 10/2022 | Thaine | G06F 16/3347 |
| 11,637,700 | B2* | 4/2023 | Kang | H04L 9/008 |
| | | | | 713/168 |
| 11,763,021 | B2* | 9/2023 | Cousins | G06F 21/602 |
| | | | | 726/26 |
| 11,829,503 | B2* | 11/2023 | Fink | G06F 21/6227 |
| 11,991,282 | B2* | 5/2024 | Nagaraja | H04L 9/0866 |
| 12,001,577 | B1* | 6/2024 | Xiong | G06N 3/04 |
| 12,135,811 | B2* | 11/2024 | Fox-Epstein | G06F 21/6218 |
| 2020/0151356 | A1* | 5/2020 | Rohloff | G06F 21/6245 |
| 2020/0244437 | A1* | 7/2020 | Ruan | H04L 9/0618 |
| 2022/0100884 | A1* | 3/2022 | Fink | G06F 16/24575 |
| 2024/0097878 | A1* | 3/2024 | Lee | G10L 15/26 |
| 2025/0055671 | A1* | 2/2025 | Soriente | H04L 9/008 |

* cited by examiner

*Primary Examiner* — Viral S Lakhia
(74) *Attorney, Agent, or Firm* — Steinfl + Bruno LLP

(57) ABSTRACT

A text search method is disclosed. The text search method includes, based on a query including a text being input, computing a vector value having a preset size by using a preset encoding algorithm, the vector value corresponding to the text, generating a query ciphertext by homomorphic encryption for the computed vector value, transmitting the generated query ciphertext to a server, receiving a calculation result ciphertext having similarity information with the query for each of a plurality of indexes, determining an index having a preset similarity by restoring the calculation result ciphertext, and receiving information corresponding to the index by transmitting the determined index to the server.

14 Claims, 7 Drawing Sheets

APPARATUS FOR PRIVACY PRESERVING TEXT SEARCH USING HOMOMORPHIC ENCRYPTION AND METHOD THEREOF

CROSS-REFERENCE TO RELATED APPLICATION(S)

This application is claiming priority of Korean patent application number 10-2022-0114120, filed on Sep. 8, 2022, in the Korean Intellectual Property Office and Korean patent application number 10-2023-0084386, filed on Jun. 29, 2023, in the Korean Intellectual Property Office, the disclosures of both of which are incorporated by reference herein in their entirety.

BACKGROUND

1. Field

The disclosure relates to an apparatus for privacy preserving text search using homomorphic encryption and a method thereof and, more particularly, to an apparatus for searching a text while using security of a query and a method thereof.

2. Description of Related Art

As communication technologies have been developed and electronic apparatuses have become actively prevalent, efforts have continuously been made to maintain communication security between electronic apparatuses. Therefore, encryption/decryption technologies have been used in most communication environments.

When a message encrypted by the encryption technology is transmitted to a counterpart, the counterpart needs to perform decryption to use the message. In this case, resources and time are wasted while the counterpart decrypts the encrypted data. In addition, when the third party's hacking occurs while the counterpart temporarily decrypts the message for calculation, the message may be easily leaked to the third party.

In order to solve this problem, a homomorphic encryption method has been studied. According to the homomorphic encryption, even though the encrypted information is not decrypted and a calculation is performed in the ciphertext itself, the same result as the encrypted value may be obtained after calculating the plaintext. Accordingly, various calculations may be performed in a state in which the ciphertext is not decrypted.

In the related-art, the calculation is performed in a state in which only the numerical data is generated as a homomorphic ciphertext and not decrypted. However, recently, with the development of a deep learning model, processing capability for unstructured data such as image, text, and voice is improved, and personal information protection for the content of information included in unstructured data is required.

SUMMARY

Therefore, the disclosure is devised to solve the problems described above, and provides an apparatus and a method for searching a text while maintaining the security of a query.

The text search method in an electronic apparatus according to an example comprising based on a query including a text being input, computing a vector value having a preset size by using a preset encoding algorithm, the vector value corresponding to the text, generating a query ciphertext by homomorphic encryption for the computed vector value, transmitting the generated query ciphertext to a server, receiving a calculation result ciphertext having similarity information with the query for each of a plurality of indexes, determining an index having a preset similarity by restoring the calculation result ciphertext, and receiving information corresponding to the index by transmitting the determined index to the server.

In this case, the method further includes converting voice data into character data, and the computing the vector value may include computing a text in the converted character data into a vector value having a preset size.

In the meantime, the vector value of the preset size may have a real number value of 32 bits within size of [−1, 1].

The preset encoding algorithm may be a bidirectional encoder representations from Transformers (BERT) language model.

In the meantime, the generating the query ciphertext may include, based on the text being composed of a plurality of sentences, computing a vector value in a unit of a plurality of sentences, homomorphically encrypting each of the vector values generated in the unit of sentences, and sequentially inserting each of the homomorphically encrypted vector values into each of a plurality of slots in the homomorphic ciphertext to generate a query ciphertext.

In the meantime, the method may further include generating a secret key and a public key corresponding to the secret key, and the transmitting the query ciphertext may include transmitting the query ciphertext and the public key together.

In the meantime, an electronic apparatus according to an example of the disclosure includes a communication apparatus to communicate with a server, a memory to store at least one instruction, and a processor to process a query by using the at least one instruction, and the processor, based on a query including a text being input, computes the text as a vector value having a preset size by using a preset encoding algorithm, generates a query ciphertext by homomorphic encryption of the computed vector value, controls the communication apparatus to transmit the generated query ciphertext to a server, based on receiving a calculation result ciphertext having similarity information with the query for each of a plurality of indexes, determines an index having a preset similarity by restoring the calculation result ciphertext, control the communication apparatus to transmit the determined index to the server, and receives information corresponding to the index through the communication apparatus.

In this case, the processor may convert voice data into character data, and compute a text in the converted character data into a vector value having a preset size.

In the meantime, the vector value of the preset size may have a real number value of 32 bits within size of [−1, 1].

In the meantime, the preset encoding algorithm may be a bidirectional encoder representations from Transformers (BERT) language model.

The processor may, based on the text being composed of a plurality of sentences, compute a vector value in a unit of a plurality of sentences, homomorphically encrypt each of the vector values generated in the unit of sentences, and sequentially insert each of the homomorphically encrypted vector values into each of a plurality of slots in the homomorphic ciphertext to generate a query ciphertext.

In the meantime, the processor may generate a secret key and a public key corresponding to the secret key, and control the communication apparatus to transmit the query ciphertext and the public key together.

In the meantime, a text search method of a server according to an example of the disclosure includes receiving a query ciphertext from an electronic apparatus, by using each of a plurality of documents and the query ciphertext, generating a calculation result ciphertext having similarity information with respect to the query ciphertext for each of the plurality of documents, transmitting the calculation result ciphertext to the electronic apparatus, and based on receiving index information from the electronic apparatus, transmitting a document corresponding to the index information, among the plurality of documents, to the electronic apparatus.

In this case, the generating the calculation result ciphertext may include computing a vector value having a preset size with respect to each of the plurality of documents by using a preset encoding algorithm and generating a calculation result ciphertext having a result of homomorphic calculation between a vector value computed with respect to each of the plurality of documents and the query ciphertext.

In this case, the generating the calculation result ciphertext may include, by sequentially inserting a vector value for each of the plurality of documents into a plurality of slots, generating first comparison target data, generating second comparison target data that encrypted query data corresponding to the query ciphertext is stored in each of a plurality of slots, and generating a calculation result ciphertext by calculating the first comparison target data and the second comparison target data.

The preset homomorphic calculation may be dot product calculation or cosine similarity calculation.

In the meantime, a server according to an example includes a communication apparatus to communicate with a server, a memory to store at least one instruction, and a processor to process a query by using the at least one instruction, and the processor, based on receiving a query ciphertext from the electronic apparatus, by using each of the plurality of documents and the received query ciphertext, generates a calculation result ciphertext having similarity information with respect to the query ciphertext, and controls the communication apparatus to transmit the generated query ciphertext to the electronic apparatus, based on receiving index information from the electronic apparatus, controls the communication apparatus to transmit a document corresponding to the index information, among the plurality of documents, to the electronic apparatus.

In this case, the processor may compute a vector value having a preset size with respect to each of the plurality of documents by using a preset encoding algorithm, and generate a calculation result ciphertext having a preset result of homomorphic calculation between a vector value calculated with respect to each of the plurality of documents and the query ciphertext.

In this case, the processor may, by sequentially inserting a vector value for each of the plurality of documents into a plurality of slots, generate first comparison target data, generate second comparison target data that encrypted query data corresponding to the query ciphertext is stored in each of a plurality of slots, and generate a calculation result ciphertext by calculating the first comparison target data and the second comparison target data.

The preset homomorphic calculation may be dot product calculation or cosine similarity calculation.

Accordingly, the disclosure is devised to solve the above-described problem. In a process of searching a query composed of text, the query is processed by homomorphic encryption, and thus a text search may be performed while protecting personal information about the query.

BRIEF DESCRIPTION OF THE DRAWINGS

The above and other aspects, and advantages of certain embodiments of the present disclosure will be more apparent from the following description taken in conjunction with the accompanying drawings, in which.

DETAILED DESCRIPTION

Figure 1:
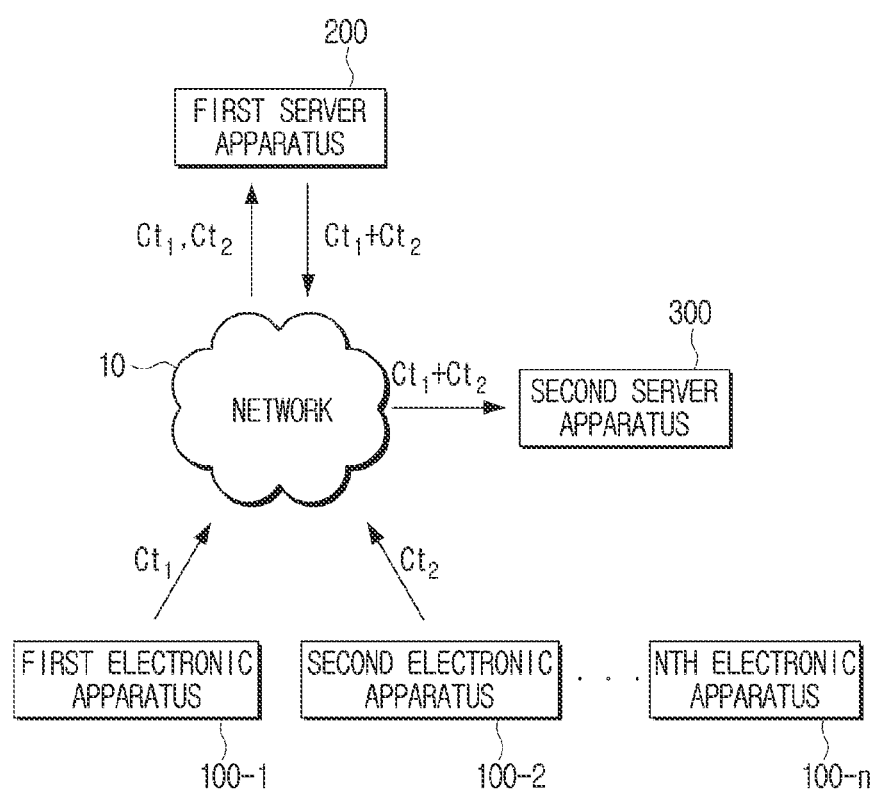
FIG. 1 is a diagram illustrating a structure of a network system according to an example of the disclosure.

Hereinafter, the disclosure will be described in detail with reference to the accompanying drawings. Encryption/decryption may be applied to an information (data) transmission process performed in the disclosure, and expressions for describing the information (data) transmission process in the disclosure and claims should all be construed to include the case of encrypting/decrypting although not mentioned separately. Expression in the form of "transmission (transfer) from A to B" or "reception by A from B" includes transmission (transfer) or reception by an intermediate medium and does not necessarily limited to only directly transmission (transfer) or reception from A to B.

In the description of the disclosure, the order of each step should be understood nonrestrictively unless a preceding step must be performed before a subsequent step logically and temporally. That is, except for the exceptional case above, although a process described as a subsequent step is performed before a process described as a preceding step, it does not affect the essence of the disclosure and the scope of the disclosure should be defined regardless of order of steps. Also, description of "A or B" is defined to mean that both A and B are included, as well as selectively indicating any one of A and B. Also, the term "including" in this specification has a comprehensive meaning to further include another component in addition to elements enumerated to be included.

In this specification, only essential components necessary for the description of the disclosure are described and components not related to the essence of the disclosure are not mentioned. Also, only the mentioned components should not be construed to be included in an exclusive sense but should be construed in a non-exclusive sense to include any other component.

In this specification, the term "value" is defined as a concept including not only a scalar value but also a vector. In the disclosure, an expression "calculate", "compute" may be replaced by an expression that a result of the calculation or computation is generated. Also, expressions such as 'process', 'change' homomorphic ciphertexts by performing processing on the homomorphic ciphertext may be replaced with expressions of generating the homomorphic ciphertext corresponding to the processing result.

In addition, if it is not separately mentioned, calculation for a ciphertext to be described below means a homomorphic calculation. For example, the addition for the homomorphic ciphertext refers to a homomorphic addition for two homomorphic ciphertexts.

In the disclosure, text-type data means data excluding numerical data such as real number and imaginary number, and includes all types of data (for example, image data and voice data) capable of converting specific information into numerical values as well as data composed of text. The text-type data may be referred to as unstructured data.

The mathematical calculation and computation of each step of the disclosure described hereinafter may be realized by a computer calculation by a coding method known for corresponding operation or calculation and/or coding devised suitably for the disclosure.

Specific formulas described hereinafter are exemplarily described among various possible alternatives, and the scope of the disclosure should not be construed as being limited to the formulas mentioned in the disclosure.

For convenience of description, the following is assumed.
a←D: element (a) is selected according to distribution (D)
s/k←(1,s(x)), s(x)∈R: S1 and S2 are each an element belonging to R set.
mod(q): Modular calculation with q elements
a(x)←R: Internal value is round off Hereinafter, various examples of the disclosure will be described in detail with reference to the accompanying drawings.

FIG. 1 is a diagram illustrating a structure of a network system according to an example of the disclosure.

Referring to FIG. 1, a network system may include a plurality of electronic apparatuses 100-1 to 100-$n$, a first server apparatus 200, and a second server apparatus 300, and these components may be connected to each other via a network 10.

The network 10 may be implemented in various types of wired/wireless communication networks, broadcast communication networks, optical communication networks, cloud networks, and the like, and each apparatus may also be connected by a method such as Wi-Fi, Bluetooth, and near field communication (NFC), and the like, without a separate medium.

In FIG. 1, a plurality of electronic apparatuses 100-1 to 100-$n$ are illustrated but the plurality of electronic apparatuses may not necessarily be used and one apparatus may be used. For example, the electronic apparatuses 100-1 to 100-$n$ may be implemented in various types of apparatuses such as smartphones, tablets, game players, PCs, laptop PCs, home servers, kiosks, and the like, and may also be implemented in the form of a home appliance to which an IoT function is applied.

A user may input various information through the electronic apparatuses 100-1 to 100-$n$ used by the user. The input information may be stored in the electronic apparatuses 100-1 to 100-$n$ but may be transmitted to and stored in an external apparatus for the reason of storage capacity and security. In FIG. 1, the first server apparatus 200 may serve to store such information, and the second server apparatus 300 may serve to use some or all of the information stored in the first server apparatus 200.

Each of the electronic apparatuses 100-1 to 100-$n$ may homomorphically encrypt the input information and transmit the homomorphic ciphertext to the first server apparatus 200. Here, the information may be a query used for searching data stored in a server as well as data stored in a server to be described later. Here, the homomorphic ciphertext is a ciphertext that may be calculated even in an encrypted state. A more detailed description of the homomorphic ciphertext will be described with reference to FIG. 2.

Each of the electronic apparatuses 100-1 to 100-$n$ may include encryption noise, i.e., an error, calculated in the process of performing the homomorphic encryption, in the ciphertext. To be specific, the homomorphic ciphertext generated by each of the electronic apparatuses 100-1 to 100-$n$ may be generated in a form in which a resultant value including a message and an error value is restored when decrypted later using a secret key.

For example, the homomorphic ciphertext generated by the electronic apparatuses 100-1 to 100-$n$ may be generated in a form satisfying the following properties when decrypted using a secret key.

$$Dec(ct,sk)=<ct,sk>=M+e(\mod q) \quad \text{[Equation 1]}$$

Here, $<, >$ are usual inner products, ct is ciphertext, sk is secret key, M is plaintext message, e is an encryption error value, and mod q is Modulus of ciphertext. q should be chosen to be greater than a resultant value M obtained by multiplying the message by a scaling factor $\Delta$. If an absolute value of the error value e is smaller enough than M, then a decrypted value M+e of the ciphertext is a value that may replace an original message with the same precision in significant digit calculation. Among the decrypted data, an error may be disposed on the least significant bit s (LSB) side and M may be disposed on a second LSB side.

If a size of the message is too small or too large, the size of the message may be adjusted using a scaling factor. When the scaling factor is used, even a message in the form of a real number, as well as the form of an integer, may be encrypted, utilization may be significantly increased. In addition, by adjusting the size of the message using the scaling factor, a size of an area in which the messages exist, that is, an effective area, in the ciphertext after the calculation is performed may also be adjusted.

According to an example, the ciphertext modulus q may be set and used in various forms. For example, the modulus of the ciphertext may be set in the form of an exponential power $q=\Delta^L$ of the scaling factor $\Delta$. If $\Delta$ is 2, q may be set to a value such as $q=2^{10}$.

In the disclosure, the homomorphic ciphertext is described on the assumption that unstructured data is homomorphically encrypted, and homomorphic encryption for numerical data is also possible, and a calculation between homomorphic ciphertexts for unstructured data and homomorphic ciphertexts for numerical data may also be performed in a process to be described below.

The first server apparatus 200 may store the received homomorphic ciphertext in the ciphertext form, without decrypting the received homomorphic ciphertext. Alternatively, the first server apparatus 200 may store various data in a plaintext state.

The second server apparatus 300 may request a specific processing result for the homomorphic ciphertext from the first server apparatus 200. The first server apparatus 200 may perform a specific calculation according to a request from the second server apparatus 300, and then transmit a result to the second server apparatus 300.

For example, when the ciphertexts ct1 and ct2 transmitted from the two electronic apparatuses 100-1 and 100-2 are stored in the first server apparatus 200, the second server apparatus 300 may request the sum of the information provided from the electronic apparatuses 100-1 and 100-2, from the first server apparatus 200. The first server apparatus 200 may perform calculation of summing the two ciphertexts according to the request, and then transmit a resultant value ct1+ct2 to the second server apparatus 300. In this case, the server apparatus 200 may perform a non-polynomial operation, a statistical operation, a similarity calculation, and the like by using an approximate function as well as the four fundamental calculations such as addition/subtraction. Here, the approximate function is a function of not outputting the same result as the specific function but outputting the similar result within the error range, and the approximate function corresponding to the above-described non-polynomial operation is configured as a polynomial function.

In addition, in the case of the query request, the first server apparatus 200 may transmit the calculation result to the electronic apparatus 100-1 transmitting the query.

In terms of the nature of the homomorphic ciphertext, the first server apparatus 200 may perform calculation without decryption, and the resultant value is also in the ciphertext form. In the disclosure, the resultant value obtained by the calculation is a calculation result ciphertext. For example, the second server apparatus 200 may perform homomorphic calculation between the first homomorphic ciphertext and the second homomorphic ciphertext by encrypting the numerical data.

The second server apparatus 200 may perform the homomorphic calculation between the first homomorphic ciphertext that encrypts the numerical data and second homomorphic ciphertext that encrypts unstructured data (e.g., text data). In addition, the second server apparatus 200 may perform homomorphic calculation between the homomorphic ciphertexts that encrypt the data in the plaintext and the unstructured data (e.g., query, text data).

The first server apparatus 200 may transmit the calculation result ciphertext to the second server apparatus 300. The second server apparatus 300 may decrypt the received calculation result ciphertext to obtain a calculation result value of data included in each homomorphic ciphertext.

The first server apparatus 200 may perform calculation several times according to a user request. In this case, an approximate message weight in the ciphertext obtained for each calculation is changed. The first server apparatus 200 may perform a bootstrapping operation when the approximate message weight exceeds a threshold. An operation for bootstrapping is described in more detail with reference to FIG. 3.

As such, in that the server apparatus 200 may perform calculation, it may be referred to as a calculation apparatus.

An operation in the data collection aspect has been described above, and a search operation for data stored in the first server apparatus 200 will be described below. The first server apparatus 200 may perform operations such as the above-described processes to store the various information in a ciphertext state, and may store various information in a plaintext state. Hereinafter, for convenience, it will be assumed that the information is stored in a plaintext state.

For example, one of various electronic apparatuses 100-1, . . . , 100-n or the second server apparatus 300 may receive a query made of a text necessary for a search and generate a homomorphic ciphertext corresponding to the query. Specifically, a corresponding apparatus (for example, 100-1) may convert a text into a vector having a preset size, and generate the converted vector as a homomorphic ciphertext. In addition, the corresponding apparatus 100-1 may transmit the generated homomorphic ciphertext to the first server apparatus 200.

The first server apparatus 200 may calculate similarity between the received query ciphertext and prestored data (or prestored ciphertext) and may transmit the similarity calculation result to the apparatus 100-1 transmitting the query ciphertext.

The apparatus 100-1 which has received the similarity calculation result may decrypt the similarity calculation result by using the secret key, and may identify an index corresponding to a result having a similarity equal to or greater than a preset value based on the decryption result. Accordingly, the corresponding apparatus 100-1 may request the corresponding index to the first server apparatus 200. Accordingly, the first server apparatus 200 may transmit a document corresponding to the corresponding index to the electronic apparatus 100-1.

As described above, according to the disclosure, the network system generates a query ciphertext for the unstructured data and provides the ciphertext to the server, it is possible to search a document corresponding to the query even without exposure of a query including sensitive information or personal information.

Meanwhile, although FIG. 1 illustrates a case that the first electronic apparatus and the second electronic apparatus perform encryption and the second server apparatus performs decryption, the disclosure is not necessarily limited thereto.

Figure 2:
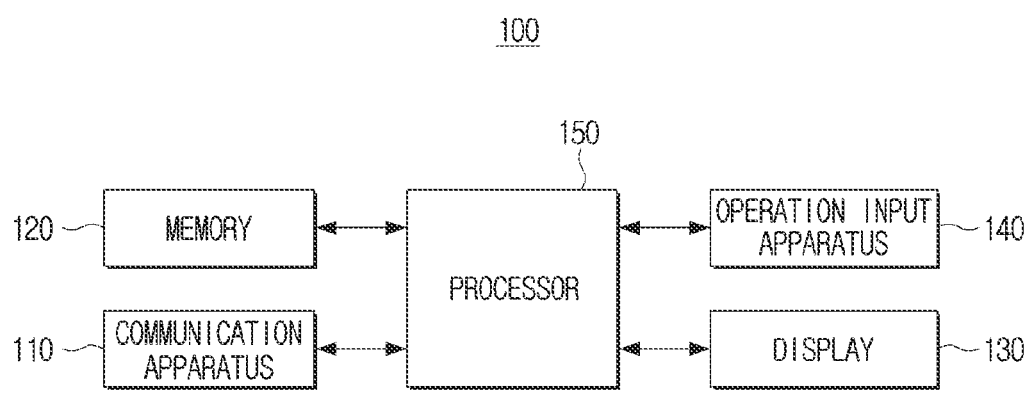
FIG. 2 is a block diagram illustrating a configuration of a calculation apparatus according to an example of the disclosure.

FIG. 2 is a block diagram illustrating a configuration of an electronic apparatus according to an example of the disclosure.

In detail, in the system of FIG. 1, not only the apparatuses that perform homomorphic encryption, such as the first electronic apparatus and the second electronic apparatus, the apparatus that calculates the homomorphic ciphertext, such as the first server apparatus or the like, but also the apparatus that decrypts the homomorphic ciphertext, such as the second server apparatus, and the like may be referred to as electronic apparatuses. The electronic apparatuses may include various apparatuses such as a personal computer, a notebook computer, a smartphone, a tablet, a server, and the like.

Referring to FIG. 2, the electronic apparatus 100 may include a communication apparatus 110, a memory 120, a display 130, an operation input apparatus 140, and a processor 150. Hereinbelow, the configuration of the electronic apparatus 100 will be illustrated and described, but the server may also include the same configuration as illustrated in FIG. 2 as described above.

The communication apparatus 110 is provided to connect the electronic apparatus 100 to an external apparatus (not shown), and here, the communication apparatus 410 may be connected to an external apparatus via a local area network (LAN) and the internet or may be connected to the external apparatus through a universal serial bus (USB) port or a wireless communication (e.g., Wi-Fi 802.11a/b/g/n, NFC, Bluetooth) port. The communication apparatus 110 may also be referred to as a transceiver.

The communication apparatus 110 may receive a public key from an external apparatus and transmit a public key generated by the electronic apparatus 100 itself to the external apparatus.

The communication apparatus 110 may receive a message from an external apparatus and may transmit the generated homomorphic ciphertext (or query ciphertext) to an external apparatus.

In addition, the communication apparatus 110 may receive various parameters necessary for generating a ciphertext from an external apparatus. Meanwhile, in the implementation, various parameters may be directly input from the user through the operation input apparatus 140 to be described later.

In addition, the communication apparatus 110 may receive a request for calculation on the homomorphic ciphertext from the external apparatus and transmit a calculated result to the external apparatus. Here, the calculation result may be various homomorphic calculations and may be a similarity calculation result for query search.

The memory 120 is configured to store operating system (O/S), various software, data, or the like, to drive the electronic apparatus 100. The memory 120 may be implemented in various forms such as a random access memory (RAM), a read-only memory (ROM), a flash memory, a hard disk drive (HDD), an external memory, a memory card, and the like, but is not limited thereto.

The memory 120 stores a message to be encrypted. Here, the message may be unstructured data such as text data, voice data, and image data as well as numerical data such as various kinds of credit information and personal information which a user uses. In addition, the electronic apparatus 100 may be information related to use history, such as location information used in the electronic apparatus 100, Internet use time information, and the like. In addition, the memory 120 may store the query as the above-described message.

The image data may be an image (e.g., an identification card, an employee card, a business card image) having personal information of a user. The text data may be data having sensitive information that has a user's personal information (address, resident registration number, phone number) or information that should not be externally exposed.

The memory 120 may store a public key, and if the electronic apparatus 100 is an apparatus that directly generates a public key, the memory 120 may store various parameters necessary for generating a public key and a secret key, as well as the secret key.

In addition, the memory 120 may store a homomorphic ciphertext generated in a process to be described later. The memory 120 may store a homomorphic ciphertext transmitted from an external apparatus. In addition, the memory 120 may store a calculation result ciphertext which is a result of the calculation as described later.

The display 130 displays a user interface window for selecting a function supported by the electronic apparatus 100. Specifically, the display 130 may display a user interface window for selecting various functions provided by the electronic apparatus 100. The display 130 may be a monitor such as a liquid crystal display (LCD), an organic light emitting diode (OLED), or the like or may be implemented as a touch screen capable of simultaneously performing a function of the operation input apparatus 140 to be described later.

The display 130 may display a message requesting input of a parameter required for generating a secret key and a public key. In addition, the display 130 may display a message in which an encryption target selects a message. Meanwhile, when implemented, the encryption target may be directly selected by the user or may be automatically selected. That is, personal information requiring encryption may be automatically set even if the user does not directly select a message.

The operation input apparatus 140 may receive selection of a function of the electronic apparatus 100 and a control command for the corresponding function from the user. Specifically, the operation input apparatus 140 may receive a parameter required for generating a secret key and a public key from the user. In addition, the operation input apparatus 140 may receive a message to be encrypted from the user.

The processor 150 controls each configuration in the electronic apparatus 100. The processor 150 may be configured as a single apparatus such as a central processing unit (CPU) or an application-specific integrated circuit (ASIC) or may include a plurality of apparatuses such as the CPU and a graphics processing unit (GPU).

When a message to be transmitted is input, the processor 150 stores the message in the memory 120. The processor 150 homomorphically encrypts the message using various set values and programs stored in the memory 120. In this case, the public key may be used. At this time, the above message may be a query. That is, when a message (query) for searching a document stored in the server apparatus 200 is input, the processor 150 may generate a query ciphertext for the message. A specific operation to generate the ciphertext for the unstructured data will be described below.

The processor 150 may generate a public key required for performing encryption by itself and use the public key or may receive the public key from an external apparatus and use the same. For example, the second server apparatus 300 that performs decryption may distribute the public key to other apparatuses.

When generating a key by itself, the processor 150 may generate the public key using a Ring-LWE technology. Specifically, the processor 150 may first set various parameters and rings and store the set parameters and rings in the memory 120. Examples of parameters may include a length of bits of a plaintext, sizes of the public key and the secret key, and the like.

The ring may be expressed by the following equation.

$$R = \mathbb{Z}_q[x]/(f(x)) \qquad [\text{Equation 2}]$$

Here R denotes a ring, Zq denotes a coefficient, and f(x) is an nth order polynomial.

The ring, as a set of polynomials with preset coefficients, refers to set in which addition and multiplication are defined between elements and which is closed for addition and multiplication. Such a ring may be referred to as a ring.

As an example, the ring refers to a set of N-th polynomials whose coefficient is Zq. Specifically, the ring refers to N-th cyclotomic polynomial when n is $\Phi(N)$. (f(x)) denotes an ideal of Zq[x] produced by (x). The Euler's totient function $\Phi(N)$ refers to the number of natural numbers which are relatively prime with N and smaller than N. If (N(x) is defined as the N-th cyclotomic polynomial, the ring may also be expressed as Equation 3 below.

$$R = \mathbb{Z}_q[x]/(\Phi_N(x)) \qquad [\text{Equation 3}]$$

The secret key (sk) may be expressed as shown below.

Meanwhile, the ring of Equation 3 described above has a complex number in a plaintext space. Meanwhile, in order to improve calculation speed for the homomorphic ciphertext, only a set in which the plaintext space is a real number, in the set of the ring described above, may also be used. As described below, in the case of unstructured data, the encrypted data corresponding to the unstructured data has the value in the real number, and information related to the unstructured data (for example, index information related to the order (for example, a word order, a sentence order, a voice order, etc.), index information related to the location, and attribute information on the attribute of the unstructured data) may have the value in the imaginary number.

When such a ring is established, the processor 450 may calculate a secret key sk from the ring.

$$sk \leftarrow (1, s(x)), s(x) \in R \qquad [\text{Equation 4}]$$

Here, s(x) denotes a polynomial generated randomly with a small coefficient.

The processor 150 calculates a first random polynomial a(x) from the ring. The first random polynomial may be expressed as follows.

$$a(x) \leftarrow R \quad \text{[Equation 5]}$$

In addition, the processor 150 may compute an error. Specifically, the processor 150 may extract an error from a discrete Gaussian distribution or a distribution having a statistical distance close thereto. This error may be expressed as follows.

$$e(x) \leftarrow \mathcal{D}_{\alpha q}^n \quad \text{[Equation 6]}$$

When the error is computed, the processor 150 may calculate a second random polynomial by performing a modular calculation on the first random polynomial and the secret key error. The second random polynomial may be expressed as follows.

$$b(x) = -a(x)s(x) + e(x) (\bmod q) \quad \text{[Equation 7]}$$

Finally, the public key pk is set in a form including the first random polynomial and the second random polynomial as follows.

$$pk(b(x), a(x)) \quad \text{[Equation 8]}$$

The method of generating the key described above is merely an example, and thus the disclosure is not limited there and the public key and the secret key may be generated in other ways.

When the public key is generated, the processor 150 may control the communication apparatus 110 to transmit the public key to other apparatuses.

The processor 150 may generate a homomorphic ciphertext for a message. To be specific, the processor 150 may generate the homomorphic ciphertext by applying the previously generated public key to the message. Here, the processor 150 may generate the ciphertext to have a length corresponding to a size of a scaling factor.

The processor 150 may identify attribute of data for performing homomorphic encryption. The processor 150 may perform preprocessing according to the identified attribute of data or may perform homomorphic encryption in a way corresponding thereto.

For example, when the encryption target is text data, the processor 150 may perform processing for removing unnecessary symbols (for example, codes, special characters) and the like from the text data, and calculate vector values for each sentence by using a preset encoding algorithm for each sentence unit. At this time, the processor 150 may calculate a vector value for each sentence by using a Bidirectional Encoder Representations from Transformer (BERT) language model. The BERT language model and the vector value calculation operation using the same will be described later with reference to FIG. 4.

In addition, the processor 150 may generate a homomorphic ciphertext by homomorphic-encrypting the calculated vector value. Specifically, a homomorphic ciphertext may be generated by homomorphic-encrypting each of vector values generated for each sentence unit and inserting the homomorphically encrypted vector value into a plurality of slots in the homomorphic ciphertext. At this time, the processor 150 may sequentially insert the homomorphically encrypted vector values into the plurality of slots to correspond to the order of sentences.

In the meantime, it has been described that text data is divided in units of sentences, and vectorization and homomorphic encryption are performed in unit of sentences, but in implementation, it is also possible to perform homomorphic encryption in a unit of a word. For example, it is possible to divide the text sentence into a unit of a word, and homomorphically encrypt an index value corresponding to each word. The index value used herein may be an index table directly defined by a user, and a location (or order) of a corresponding word in a specific dictionary may be used.

In addition, in the case of the text data used for a chatting service, a social network service (SNS), it is possible to perform homomorphic ciphertext in a unit of a distinguished text unit by distinguishing texts in an order of chatting (or an order of channels of users), SNS posting order (time order).

If the target of encryption is voice data, the processor 150 may perform homomorphic encryption by one of the two methods below. To be specific, there is a method of homomorphic encryption of a digitized signal value by frequency bands for voice data. That is, homomorphic encryption is performed by considering a signal value itself constituting the voice data as a numerical value.

In this case, the processor 150 may generate homomorphic ciphertexts by splitting voice data into preset time units, homomorphically encrypting the voice data for each time unit, and inserting the encrypted data of several time units into a plurality of slots in the homomorphic ciphertext. Specifically, voice data may be homomorphically encrypted in a preset time unit, and homomorphic ciphertexts may be generated by inserting the homomorphically encrypted voice data into a plurality of slots. At this time, the processor 150 may sequentially insert the homomorphically encrypted voice data into a plurality of slots corresponding to the time order.

Alternatively, the processor 150 may generate an order index for each voice data and may insert encrypted voice data corresponding to the generated order index into one slot. To be specific, the processor 150 may insert encrypted voice data described above into an area of a real number in the homomorphic ciphertext and insert an order index in an area of an imaginary number. At this time, the order index may be stored in a state of a plaintext, or homomorphically encrypted and stored in an encrypted state. In addition, the encrypted voice data may be stored in an imaginary number area and the order index may be stored in the real number area.

Secondly, the content of voice data may be homomorphically encrypted, and the processor 150 may generate text data by performing voice recognition for the voice data and may homomorphically encrypt the generated text data. The homomorphic encryption of the text data may be performed in a way described above.

If an encryption target is an image, the processor 150 may perform homomorphic encryption based on one of two manners below. Firstly, image data itself is homomorphically encrypted, and each of data by channels (e.g., R/G/B or CMYK, etc.) constituting an image is homomorphically encrypted.

At this time, the processor 150 may divide the corresponding image into a plurality of areas according to the size of the image, and homomorphic-encrypt the data for the divided areas. For example, when one image is divided into nine blocks, homomorphic encryption for each block may be performed, and each block may be stored in each slot in a homomorphic ciphertext. In this case, the processor 150 may store an encrypted image block in a slot order corresponding to a block order. Alternatively, the processor 150 may assign an index to each block, and store the assigned index and an encrypted block image corresponding to the index in one slot. For example, a block image encrypted in a real number area in a ciphertext may be stored, and a block index may be stored in an imaginary number area.

Secondly, text (information) in the image data is homomorphically encrypted, and the processor 150 may perform OCR for the image data and homomorphically encrypt the text data obtained as a result of OCR.

In the meantime, an image may have various forms, for example, in the case of a photograph, homomorphic encryption may be performed in the first manner as described above. In addition, it is possible to perform homomorphic encryption in a second manner with respect to an image such as a document in which only text exists. In the case of an image in which a photo (or graphic) and a text are mixed, homomorphic encryption is performed in the first manner described above with respect to an area corresponding to the photo, OCR is performed on the text area as in the second manner described above, and the text corresponding to the OCR result may be homomorphically encrypted.

In this case, the processor 150 may perform separate encryption on the information about the layout of text, photos, and the like included in the image, thereby allowing the same type of image to be reconstructed in a later restoration process. For example, the processor 150 may store an area (i.e., a placement location) on an image of data stored in each slot and attribute information on the attribute.

For example, when A image and B text are disposed in one image, the processor 150 may perform encryption in a manner corresponding to each content attribute as described above. The processor 150 may insert the encrypted A image in the first slot into a real number area, insert the attribute information that the A image is an image and the location of the arrangement in an imaginary number area, insert the homomorphic encryption result of a vector value (or ASCII value constituting the text) for the B text in the second slot in the real number area, and may insert the information that the B text is a text and a disposition location in the imaginary number area. As an example, it is described that one content is described as being located in one slot in a homomorphic ciphertext, but in implementation, one content may occupy a plurality of slots. For example, the encrypted data for the A block of the image is located in the first slot, and the encrypted data for the B block of the image is located in the second slot, and the like.

As such, various types of encryption is available for an image, and the processor 150 may, before performing homomorphic encryption for an image, proceed encryption based on selection by a user, proactively determine the encryption through image analysis, and perform processing corresponding to the determined method.

In the above, homomorphic encryption method about three unstructured data like text data, voice data, and image data is described, but it is possible to homomorphically encrypt various unstructured data in addition to the aforementioned example.

When the homomorphic ciphertext is generated, the processor 150 may control the communication apparatus 110 to store the generated ciphertext in the memory 120 or transmit the ciphertext to another apparatus according to a user request or a preset default command.

Meanwhile, according to an example of the disclosure, packing may be performed. The use of packing in homomorphic encryption makes it possible to encrypt multiple messages in a single ciphertext. Here, one ciphertext may be expressed as having a plurality of slots, and a ciphertext for one unstructured data may be stored in each of the slots. For example, when a homomorphic ciphertext for text data composed of a plurality of sentences is generated, a vector value corresponding to each sentence may be calculated, and homomorphic encryption data for the calculated vector value may be inserted into each slot to generate a homomorphic ciphertext. In this case, when calculation is performed between the ciphertexts in the electronic apparatus 400, calculation burden is significantly reduced because the calculation is performed on a plurality of messages in parallel.

Specifically, when a message includes a plurality of message vectors, the processor 150 may convert the plurality of message vectors into a polynomial that may be encrypted in parallel, and then multiply the polynomial by a scaling factor, and perform homomorphic encryption thereon using a public key. Accordingly, a ciphertext packing a plurality of message vectors may be generated.

When the homomorphic ciphertext is required to be decrypted, the processor 150 may generate a polynomial deciphertext by applying a secret key to the homomorphic ciphertext and generate a message by decoding the polynomial deciphertext. Here, the generated message may include an error as mentioned in Equation 1 described above.

In addition, the processor 150 may perform calculation on the ciphertext. Specifically, the processor 150 may perform calculation such as addition or multiplication, while maintaining the encrypted state regarding the homomorphic ciphertext. In addition, the processor 150 may perform not only four fundamental calculations as described above but also various statistical calculations.

In the meantime, when the calculation is completed, the electronic apparatus 100 may detect data of a valid area from calculation result data. Specifically, the electronic apparatus 100 may perform a rounding process on the calculation result data to detect data of a valid area. The rounding process refers to round-off of a message in an encrypted state. Alternatively, the rounding process may also be referred to as rescaling. Specifically, the electronic apparatus 100 multiplies each component of the ciphertext by Delta ($\Delta$)', which is the reciprocal of the scaling factor, and rounding same, thereby removing the noise area. The noise area may be determined to correspond to a size of the scaling factor. As a result, a message of an effective area excluding the noise area may be detected. Since the encryption is performed in the encryption state, an additional error occurs, but the size is sufficiently small, and thus may be ignored.

In the meantime, the operation in a case where the electronic apparatus 100 of the disclosure operates as the first server apparatus 200 of FIG. 1 will be described.

The processor 150, when receiving the query ciphertext corresponding to the query from the external apparatus, may generate a calculation result ciphertext having similarity information about the query ciphertext for each of a plurality of documents by using each of the plurality of documents and the query ciphertext.

To be specific, the processor 150 may calculate a vector value having a preset size using preset by using a preset encoding algorithm for each of a plurality of documents and generate a calculation result ciphertext having a preset homomorphic calculation result between the calculated vector value for each of a plurality of documents and the query ciphertext.

In order to more rapidly perform the above operation, the processor 150 may generate first comparison target data by sequentially inserting a vector value for each of the plurality of documents into a plurality of slots, generate second comparison target data in which encrypted query data corresponding to the query ciphertext is stored in each of the plurality of slots, and generate a calculation result ciphertext by calculating the first comparison target data and the second comparison target data based on dot product or cosine similarity.

In the meantime, in the implementation, the processor 150 may prepare the first comparison target data in advance, insert an index and a vector value corresponding to the document corresponding to the slot described above, and map the number of the slot to the index. For example, when the slot number is 1 to 100, a vector value corresponding to the first document may be stored in the first slot. Alternatively, the homomorphic ciphertext may be composed of an imaginary number and a real number value. A vector value may be stored in a real number portion, and an index value corresponding to the corresponding vector may be stored in the imaginary number portion.

Therefore, in a similarity checking process, it is possible to find an index value equal to or greater than a preset value by restoring an index value stored in an imaginary number and use an index stored in a real number in a slot having the corresponding index value. Alternatively, when the slot location is used as an index, the similarity of each slot may be checked, a slot location equal to or greater than a preset value may be identified, and the identified slot may be used as an index.

In the meantime, in the above description, it has been described that the dot product calculation or cosine similarity is used as similarity calculation, but in implementation, it is possible to use various homomorphic calculations in addition to the calculation method described above. In the process above, it has been described that the first comparison target data is made by inserting the vector value as it is to the slot, but in implementation, it is possible to homomorphically encrypt the vector value and store the same.

The processor 150 may control the communication apparatus 110 to transmit the calculation result ciphertext to the apparatus that transmits the query ciphertext.

When the index is received from the corresponding apparatus, the processor 150 may control the communication apparatus 110 to transmit the document corresponding to the index.

As described above, the electronic apparatus 100 according to an example of the disclosure may perform homomorphic encryption and homomorphic calculations on general numerical data, and may perform homomorphic encryption and homomorphic calculations on unstructured data. In addition, a query ciphertext obtained by homomorphic-encrypting a query of a user is generated and transmitted to another apparatus, and an apparatus for receiving the query ciphertext may not identify sensitive information included in the query, thereby supplementing information included in the query.

In the meantime, FIG. 2 illustrates that the electronic apparatus 100 includes various configurations, but some configurations (for example, speaker, camera, microphone) may be implemented in an omitted format. In addition, the electronic apparatus 100 of FIG. 2 may further include another configuration (e.g., speaker, camera, microphone) other than the above configurations.

Figure 3:
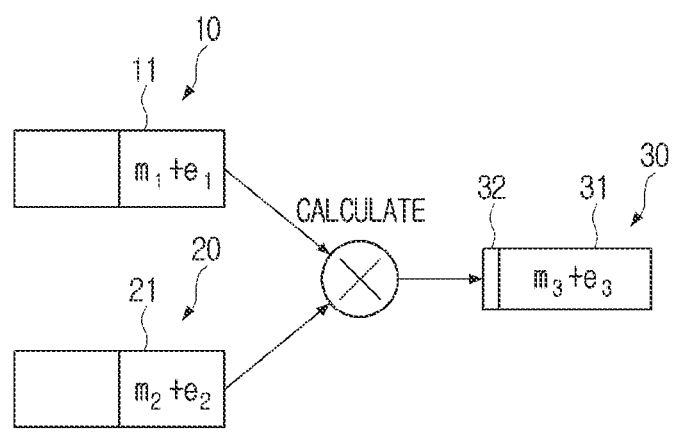
FIG. 3 is a diagram illustrating a calculation operation of a homomorphic ciphertext.

To be specific, FIG. 3 describes a calculation operation for the homomorphic ciphertext. FIG. 3 represents calculation with respect to two homomorphic ciphertexts 10, 20.

Each homomorphic ciphertext 10, 20 may each include the approximate message areas 11, 21. The approximate message areas 11, 21 include a message and error (m1+e1, m2+e2) together.

For example, when two homomorphic ciphertexts encrypt this numerical data, the homomorphic calculation result $(Enc(m_3)=Enc(m_1)+Enc(m_2))$ of two homomorphic ciphertexts equals homomorphic encryption of the calculation result $(Enc(m_1+m_2))$ on the plaintext.

In case of the homomorphic ciphertext of the calculation, the approximate message weight may exceed a threshold value. As such, if the approximate message weight exceeds a threshold value, additional calculation with respect to the homomorphic ciphertext may be difficult.

Accordingly, when the approximate message weight in the calculation result exceeds a threshold value, the electronic apparatus 100 may perform a bootstrapping operation to reduce the approximate message weight. As described above, in the disclosure, the approximate message weight of the homomorphic ciphertext may be adjusted by using the bootstrapping operation, thereby continuously performing the calculation on the homomorphic ciphertext.

Hereinbelow, the calculation method with respect to unstructured data instead of general numerical data will be described.

For example, it is assumed that distribution of living area of people having a name of "AAA" is statistically analyzed. It is possible that the residential area is digitized to a specific value corresponding to the residential area like Seoul 1, Busan 2, or the like, and stored, but it is difficult to digitize and store a name. Therefore, it is assumed that the name is stored as a text itself, and the residential area is stored as a numerical value corresponding to the area.

In this case, a vector value corresponding to "AAA" may be calculated and a query ciphertext that homomorphically encrypts the vector value may be generated. The server receiving the query ciphertext may make comparison data having a name and an index for the corresponding name in the prestored DB.

In addition, homomorphic similarity calculation between the received query ciphertext and the comparison data may be performed. Although the comparison target is a ciphertext and a plaintext, the homomorphic calculation result and homomorphic similarity result have a ciphertext value, and thus the name stored in the DB may be prevented from being exposed even when the corresponding homomorphic similarity result is transferred to the electronic apparatus 100. That is, the electronic apparatus 100 is only capable of checking only the index matching the name of the electronic apparatus 100.

Therefore, the electronic apparatus 100 may, when receiving a calculation result, restore the calculation result using a secret key and identify an index having similarity greater than or equal to a requested query.

Therefore, the electronic apparatus 100 may request the corresponding index to the server apparatus 200, and may receive information corresponding to the index. Meanwhile, in the implementation, security or encryption may be applied in the transceiving process of the index and the information about the index.

In the meantime, the calculation operation is merely an example, and the aforementioned objective may be achieved by a method other than the above-mentioned method by combining various homomorphic calculation methods. In addition, the unstructured data may be used in various fields, and may be applied to a case where personal information protection is necessary other than the above example.

Figure 4:
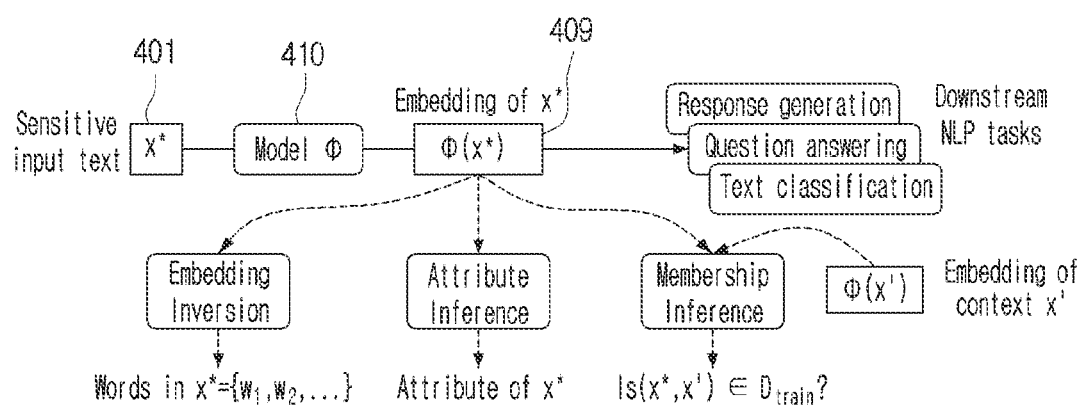
FIG. 4 is a diagram illustrating an operation of converting unstructured data to numerical data, and, FIG. 5 is a diagram illustrating a query processing method according to the disclosure.

FIG. 4 is a diagram illustrating an operation of converting unstructured data to numerical data.

Referring to FIG. 4, the BERT language model that converts text data to numerical data is illustrated. Hereinbelow, an example of using the BERT language model is used is illustrated, but in implementation, another language model other than the BERT language model may be used if the model may convert the text data to numerical data.

The BERT model is a model for embedding and converting inputted character data into numerical data. The model converts one text sentence to one vector of the length of 768 or an array of 768x tokens. The numerical data may be a 32-bit real number in a floating-point format between [−1, 1]. The model checks a word index (numerical value) corresponding to each of a plurality of words constituting one sentence, sets a corresponding plurality of word index values as an input value of the corresponding model, and calculates a vector value as described above.

As such, although the BERT calculates a vector value made of numbers, the BERT may restore an original text based on the corresponding vector value. By reflecting this, the text data is divided into sentences, the aforementioned vector value is encrypted by divided sentences, and homomorphic encryption for the character data is performed.

In the meantime, it has been described that the homomorphic encryption is performed in a unit of character string, but it is also possible to perform homomorphic encryption in the word index unit which is an input unit of the BERT model.

For example, if the sentence "I like korea" is homomorphically encrypted, the method of homomorphic encrypting the output vector value of the BERT model with respect to "I like korea" is available. Also, it is possible to homomorphically encrypt the word index value corresponding to "I", the word index value corresponding to "like", and the word index value corresponding to "korea", respectively.

When homomorphically encrypting the text in a unit of a sentence, it is possible to utilize the homomorphic ciphertext as shown below.

In the meantime, a query used in a process of searching for a document and the like is composed of text, and the corresponding text may include personal information or sensitive information of a user. According to the disclosure, a query including personal information or sensitive information of the user is converted into a vector value through the above-described process, and the query is homomorphically encrypted to be transmitted to a server. In the server, it is impossible to check sensitive information or personal information included in a user's query. That is, it is possible to prevent a user's query or the like from being exposed to an external apparatus.

Figure 5:
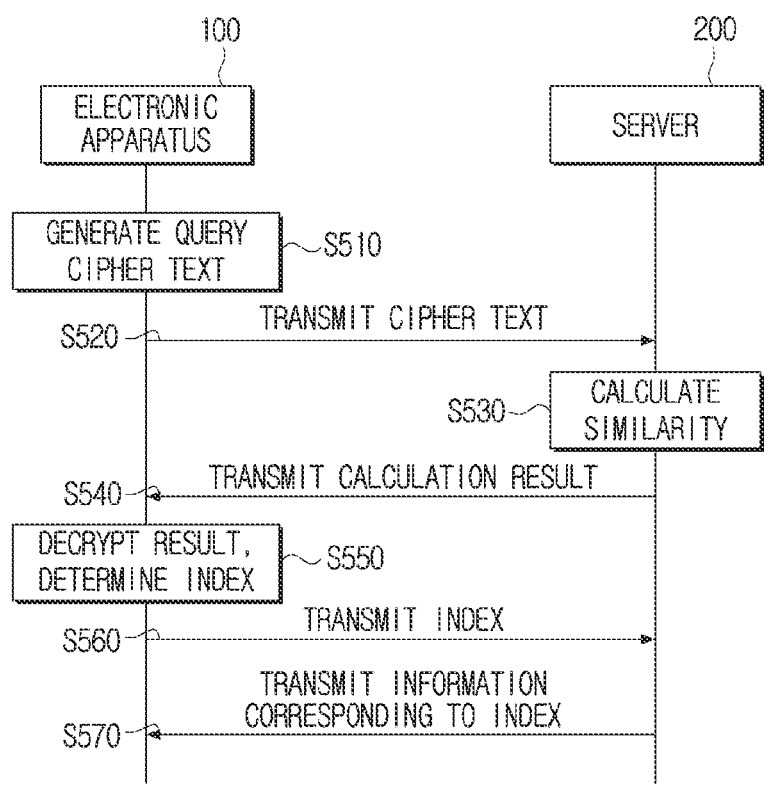

FIG. 5 is a diagram illustrating a query processing method according to the disclosure.

First, when a query including text is input, the electronic apparatus 100 may generate a homomorphic ciphertext for the corresponding query in operation S510. Specifically, the electronic apparatus 100 calculates a vector value having a preset size by using a preset encoding algorithm. Here, a vector value of a preset size may have a real number value of 32 bits within [−1, 1] size, and a preset encoding algorithm may be a BERT language model. In the implementation, another language model capable of changing a sentence to a specific vector other than the above-described BERT language model may be used.

In the meantime, it has been described that the text is input, but in implementation, the voice data may be input. For example, the electronic apparatus 100 may, when voice data is input, convert the voice data into the character data, and may calculate the text in the converted character data into a vector value having a preset size.

The electronic apparatus 100 may generate a query ciphertext by homomorphic-encrypting the calculated vector value. Specifically, when a text is composed of a plurality of sentences, the electronic apparatus 100 may calculate a vector value in units of a plurality of sentences, homomorphic-encrypt each of vector values generated for each sentence unit, and sequentially insert each homomorphically encrypted vector value into each of a plurality of slots in a homomorphic ciphertext to generate a query ciphertext.

In addition, the electronic apparatus 100 transmits the generated query ciphertext to the server apparatus in operation S520. At this time, the electronic apparatus 100 may transmit the generated public key along with the query ciphertext.

The server apparatus 200 may receive the query ciphertext from the electronic apparatus 100 and may, by using each of a plurality of documents and the query ciphertext, generate a calculation result ciphertext having similarity information about the query ciphertext with respect to each of a plurality of documents in operation S530.

Specifically, the server apparatus 200 may calculate a vector value having a preset size by using a preset encoding algorithm for each of a plurality of documents, and generate a calculation result ciphertext having a result of a preset homomorphic calculation between the calculated vector value for each of the plurality of documents and the query ciphertext. Meanwhile, in implementation, the above-described vector value calculation may be generated in advance at the server apparatus side. For example, a server apparatus may make in advance an index value corresponding to a document and a vector value for a corresponding document into one lookup table.

In the meantime, the homomorphic ciphertext may include a plurality of slots. To be specific, calculation of the homomorphic ciphertext requires a lot of time as compared to plaintext calculation, but has a characteristic that parallel calculation is possible. As such, by storing the encryption data in a plurality of slots and processing the same, that is, by processing homomorphic calculation for each slot in parallel, more rapid calculation is possible.

Therefore, a calculation result ciphertext may be generated by the method as shown below. To be specific, by sequentially inserting a vector value for each of the plurality of documents into a plurality of slots, first comparison target data may be generated, second comparison target data that encrypted query data corresponding to the query ciphertext is stored in each of a plurality of slots may be generated, and a calculation result ciphertext may be generated by calculating the first comparison target data and the second comparison target data. At this time, the preset homomorphic calculation may be dot product calculation or cosine similarity calculation.

In addition, the server apparatus 200 transmits the generated calculation result ciphertext to the electronic apparatus 100 in operation S540.

In addition, the electronic apparatus 100 may receive a calculation result ciphertext having similarity information with a query for each of a plurality of indexes and may restore the calculation result ciphertext by using a secret key.

Therefore, when the calculation result ciphertext is restored, similarity values with the transmitted query may be identified, and a slot (or index) having similarity greater than or equal to a preset value may be identified in operation S550. At this time, one index may be determined, or a plurality of indexes may be determined.

In addition, the electronic apparatus 100 transmits the determined index to the server apparatus in operation S560.

In addition, when receiving the index information from the electronic apparatus, the server apparatus 200 transmits a document corresponding to the index information, among a plurality of documents, to the electronic apparatus in operation S570.

In addition, the electronic apparatus 100 receives a document corresponding to the index in operation S660.

The method according to the disclosure performs a search operation by encrypting query information of a user, so in the server apparatus, information of a query requested by a user may not be checked. That is, a text search operation may be performed while protecting personal information from the server apparatus.

The table below represents an example of a case of applying the aforementioned operation with respect to various dataset.

TABLE 1

|  | Max Absolute Error | Mean Absolute Error | Max Relative Error(%) | Mean Relative Error(%) | Time (seconds) | No. of data |
| --- | --- | --- | --- | --- | --- | --- |
| SICKRelatedness | 1.06E−06 | 4.70E−08 | 3.60E−03 | 8.44E−06 | 167.8584 | 4927 |
| STS12 | 1.28E−06 | 5.08E−08 | 1.83E−03 | 8.44E−06 | 117.8579 | 3108 |
| STS13 | 8.07E−07 | 4.68E−08 | 5.76E−04 | 8.08E−06 | 70.7895 | 1500 |
| STS14 | 1.16E−06 | 4.60E−08 | 3.19E−04 | 7.20E−06 | 130.5614 | 3750 |
| STS15 | 8.22E−07 | 3.89E−08 | 4.20E−03 | 9.90E−06 | 113.6281 | 3000 |
| STS16 | 6.81E−07 | 4.90E−08 | 3.85E−04 | 7.51E−06 | 59.0944 | 1186 |
| STS Benchmark | 9.91E−07 | 4.59E−08 | 7.58E−03 | 9.35E−06 | 266.452 | 8628 |

Referring to Table, it may be identified that a normal text search operation may be performed on various data sets. In addition, it may be seen that the search process takes some time but the operation is performed with high accuracy. Meanwhile, the above calculation time is required due to calculation speed of the homomorphic ciphertext itself, and when improvement of the calculation speed for the homomorphic calculation occurs, it is possible to increase the search speed according to the disclosure.

As described above, the search method according to the disclosure may be applied to fields requiring protection while requiring natural language processing technologies such as voice recognition, chatbot, Ai speakers, and the like, and may be applied to various unstructured data such as text and voice as well as existing numerical data. In addition, it is possible to obtain a flexible search result that abundantly considers up to contextual information through the use of an embedding vector while protecting personal information from a server with respect to a query containing sensitive personal information.

Figure 6:
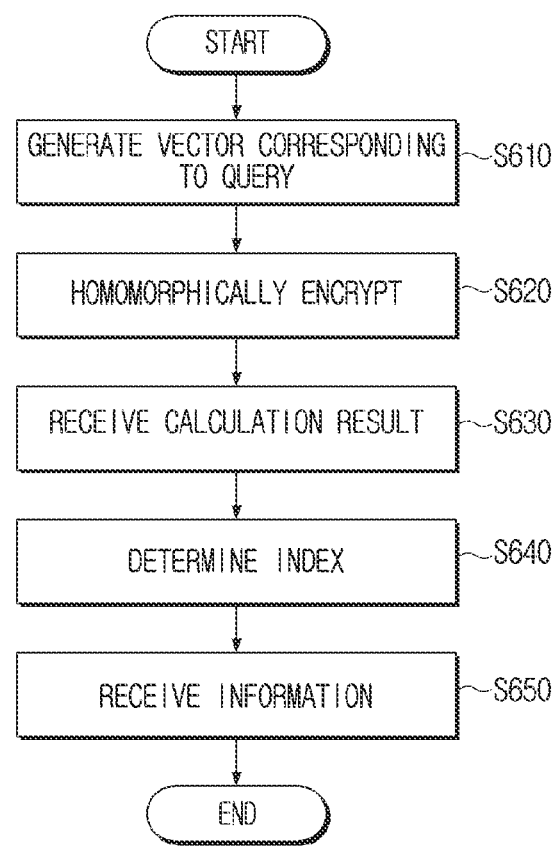
FIG. 6 is a flowchart illustrating a method of search by an electronic apparatus according to an example.

FIG. 6 is a flowchart illustrating a method of search by an electronic apparatus according to an example.

Referring to FIG. 6, first, a secret key, a public key, a calculation key, and the like to be used for generating a homomorphic ciphertext may be generated. Meanwhile, in implementation, the various keys may be previously generated before the search operation described above, and the public key and the like may have been transmitted to a server in advance, rather than in the following processes. In addition, the above-described key may be generated in a key generation apparatus other than the electronic apparatus 100, and the electronic apparatus may receive and use information on keys generated by the key generation apparatus.

First of all, when a query including a text is input, a text is calculated as a vector value having a preset size by using a preset encoding algorithm in operation S610. Here, the vector value of the preset size may have a real number value of 32 bits within size of [−1, 1], and the preset encoding algorithm may be a bidirectional encoder representations from Transformers (BERT) language model. In implementation, another language model that may change a sentence other than the above BERT language model to a specific vector may be used.

It has been described that a text is received, but in implementation, voice data may be received. When the voice data is received, voice data may be converted into character data, and a text in the converted character data may be computed into a vector value having a preset size)

The query ciphertext is generated by homomorphically encrypting the computed vector value in operation S620. To be specific, based on the text being composed of a plurality of sentences, a vector value may be computed in a unit of a plurality of sentences, each of the vector values generated in the unit of sentences may be homomorphically encrypted, and by sequentially inserting each of the homomorphically encrypted vector values into each of a plurality of slots in the homomorphic ciphertext, a query ciphertext may be generated.

In addition, the generated query ciphertext may be transmitted to a server, and a calculation result ciphertext having similarity information with a query for each of a plurality of indexes in response thereto may be received in operation S630. In the above-described transmission process, a public key generated may be transmitted along with the query ciphertext.

The received calculation result ciphertext may be restored to the previously generated secret key, and a similarity value for each of the plurality of documents (specifically, indexes) may be checked by using the restored result. In addition, an index to be requested may be determined by using the checked similarity value in operation S640.

When the index is determined, the determined index may be requested to the server apparatus 200 and a document (or information) corresponding to the request may be received.

Through the search method of the disclosure, a flexible search result that abundantly considers contextual information may be obtained through the use of an embedding vector while protecting personal information from a server with respect to a query containing sensitive personal information.

Figure 7:
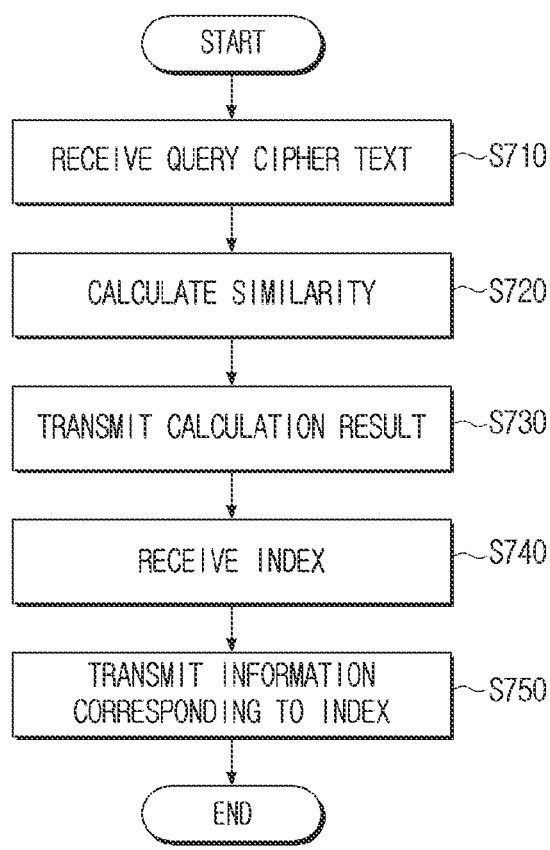
FIG. 7 is a flowchart illustrating a method of search by a server according to an example of the disclosure.

FIG. 7 is a flowchart illustrating a method of search by a server according to an example of the disclosure.

Referring to FIG. 7, a query ciphertext is received from the electronic apparatus in operation S710. At this time, a public key (or calculation key) applicable to the ciphertext may be received along with the query ciphertext.

The calculation result ciphertext having similarity information for the query ciphertext for each of the plurality of documents is generated by using each of the plurality of documents and the query ciphertext in operation S720. Specifically, a vector value having a predetermined size is calculated by using a preset encoding algorithm for each of a plurality of documents, and a calculation result ciphertext having a result of a predetermined homomorphic calculation between the calculated vector value for each of the plurality of documents and the query ciphertext may be generated. Meanwhile, the above-described vector value calculation in implementation may be previously generated on the server side. For example, the server may previously make an index value corresponding to the document and a vector value for the document into one lookup table.

In the meantime, the homomorphic ciphertext may include a plurality of slots, and calculation for each slot may be processed in parallel, so for rapid calculation, the calculation result ciphertext may be generated by the method below. To be specific, by sequentially inserting a vector value for each of the plurality of documents into a plurality of slots, first comparison target data may be generated, second comparison target data that encrypted query data corresponding to the query ciphertext is stored in each of a plurality of slots may be generated, and a calculation result ciphertext may be generated by calculating the first comparison target data and the second comparison target data. At this time, the preset homomorphic calculation may be dot product calculation or cosine similarity calculation.

In addition, the calculation result ciphertext is transmitted to the electronic apparatus in operation S730.

In addition, when index information is received from the electronic apparatus, a document corresponding to the index information among a plurality of documents is transmitted to the electronic apparatus in operation S740.

As such, according to the disclosure, it is possible to perform a similarity calculation for various unstructured data such as text data, image data, and voice data as well as numerical data, and it is possible to apply the similarity calculation to a text search process. Accordingly, the server may not know the query requested by the user, but it is possible to provide information corresponding to the query.

Meanwhile, the method (or search method) of processing a ciphertext according to various examples described above may be implemented in the form of a program code for performing each step and may be stored in a recording medium and distributed. In this case, an apparatus in which the recording medium is mounted may perform the operations such as encryption, ciphertext processing, or the like described above.

The recording medium may be various types of computer-readable mediums such as ROM, RAM, memory chip, memory card, external hard disk, hard disk, CD, DVD, magnetic disk, or magnetic tape.

While the disclosure has been described with reference to the accompanying drawings, it is to be understood that the scope of the disclosure is defined by the claims described hereinafter and should not be construed as being limited to the above-described embodiments and/or drawings. It is to be clearly understood that improvements, changes, and modifications that are obvious to those skilled in the art are also within the scope of the disclosure as defined in the claims.

What is claimed is:

1. A text search method in an electronic apparatus, the method comprising:
   based on a query including a text being input, computing a vector value having a preset size by using a preset encoding algorithm, the vector value corresponding to the text;
   generating a query ciphertext by homomorphic encryption for the computed vector value;
   transmitting the generated query ciphertext to a server;
   receiving a calculation result ciphertext having similarity information with the query for each of a plurality of indexes;
   determining an index having a preset similarity by restoring the calculation result ciphertext; and
   receiving information corresponding to the index by transmitting the determined index to the server;
   wherein the generating the query ciphertext comprises, based on the text being composed of a plurality of sentences, computing a vector value in a unit of a plurality of sentences, homomorphically encrypting each of the vector values generated in the unit of sentences, and sequentially inserting each of the homomorphically encrypted vector values into each of a plurality of slots in the homomorphic ciphertext to generate a query ciphertext.

2. The method of claim 1, further comprising:
   converting voice data into character data;
   wherein the computing the vector value comprises computing a text in the converted character data into a vector value having a preset size.

3. The method of claim 1, wherein the vector value of the preset size has a real number value of 32 bits within size of [−1, 1].

4. The method of claim 1, wherein the preset encoding algorithm is a bidirectional encoder representations from Transformers (BERT) language model.

5. The method of claim 1, further comprising:
   generating a secret key and a public key corresponding to the secret key,
   wherein the transmitting the query ciphertext comprises transmitting the query ciphertext and the public key together.

6. An electronic apparatus comprising:
   a communication apparatus to communicate with a server;
   a memory to store at least one instruction; and
   a processor to process a query by using the at least one instruction,
   wherein the processor configured to:
   based on a query including a text being input, compute a vector value having a preset size by using a preset encoding algorithm, the vector value corresponding to the text,
   generate a query ciphertext by homomorphic encryption for the computed vector value;
   transmit the generated query ciphertext to a server,
   receive a calculation result ciphertext having similarity information with the query for each of a plurality of indexes,
   determine an index having a preset similarity by restoring the calculation result ciphertext; and
   receive information corresponding to the index by transmitting the determined index to the server;
   wherein the processor, based on the text being composed of a plurality of sentences, computes a vector value in a unit of a plurality of sentences, homomorphically encrypts each of the vector values generated in the unit of sentences, and sequentially inserts each of the homomorphically encrypted vector values into each of a plurality of slots in the homomorphic ciphertext to generate a query ciphertext.

7. The apparatus of claim 6, wherein the processor converts voice data into character data, and computes a text in the converted character data into a vector value having a preset size.

8. The apparatus of claim 6, wherein the vector value of the preset size has a real number value of 32 bits within size of [−1, 1].

9. The apparatus of claim 6, wherein the preset encoding algorithm is a bidirectional encoder representations from Transformers (BERT) language model.

10. The apparatus of claim 6, wherein the processor generates a secret key and a public key corresponding to the secret key, and transmits the query ciphertext and the public key together.

11. A text search method of a server, the method comprising:

receiving a query ciphertext from an electronic apparatus;

by using each of a plurality of documents and the query ciphertext, generating a calculation result ciphertext having similarity information with respect to the query ciphertext for each of the plurality of documents;

transmitting the calculation result ciphertext to the electronic apparatus; and based on receiving index information from the electronic apparatus, transmitting a document corresponding to the index information, among the plurality of documents, to the electronic apparatus;

wherein the generating the calculation result ciphertext comprises:

computing a vector value having a preset size with respect to each of the plurality of documents by using a preset encoding algorithm; and generating a calculation result ciphertext having a result of homomorphic calculation between a vector value computed with respect to each of the plurality of documents and the query ciphertext; and wherein the generating the calculation result ciphertext comprises, by sequentially inserting a vector value for each of the plurality of documents into a plurality of slots, generating first comparison target data, generating second comparison target data that encrypted query data corresponding to the query ciphertext is stored in each of a plurality of slots, and generating a calculation result ciphertext by calculating the first comparison target data and the second comparison target data.

12. The method of claim 11, wherein the preset homomorphic calculation is dot product calculation or cosine similarity calculation.

13. A server comprising:

a communication apparatus to communicate with a server;

a memory to store at least one instruction; and a processor to process a query by using the at least one instruction, wherein the processor based on receiving a query ciphertext from the electronic apparatus, by using each of the plurality of documents and the received query ciphertext, generates a calculation result ciphertext having similarity information with respect to the query ciphertext, and controls the communication apparatus to transmit the generated query ciphertext to the electronic apparatus, based on receiving index information from the electronic apparatus, controls the communication apparatus to transmit a document corresponding to the index information, among the plurality of documents, to the electronic apparatus;

wherein the processor computes a vector value having a preset size with respect to each of the plurality of documents by using a preset encoding algorithm, and generates a calculation result ciphertext having a preset result of homomorphic calculation between a vector value calculated with respect to each of the plurality of documents and the query ciphertext; and wherein the processor by sequentially inserting a vector value for each of the plurality of documents into a plurality of slots, generates first comparison target data, generates second comparison target data that encrypted query data corresponding to the query ciphertext is stored in each of a plurality of slots, and generates a calculation result ciphertext by calculating the first comparison target data and the second comparison target data.

14. The server of claim 13, wherein the preset homomorphic calculation is dot product calculation or cosine similarity calculation.

* * * * *